No. 704,210. Patented July 8, 1902.
J. QUIN.
SANDER FOR RAILWAYS.
(Application filed Aug. 24, 1901.)
(No Model.)
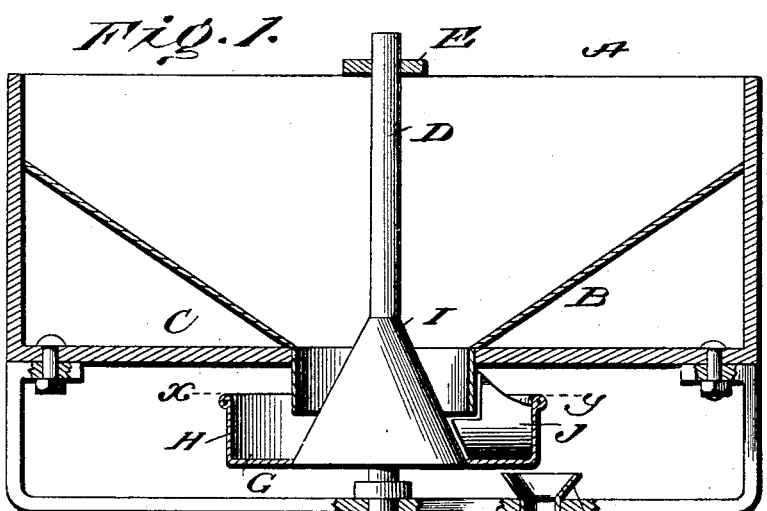
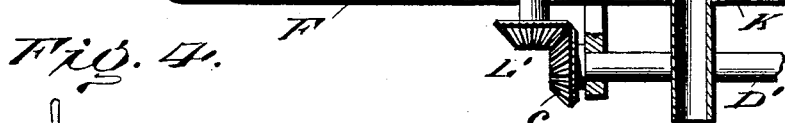
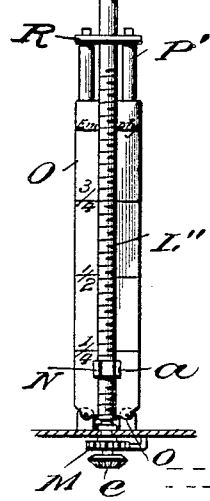
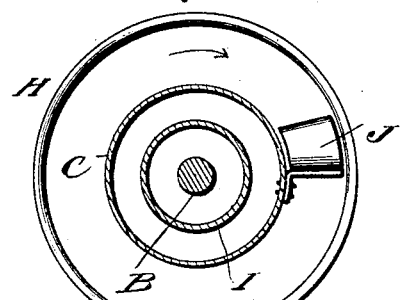
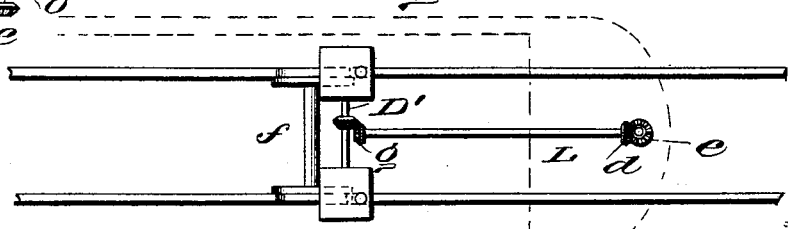
Witnesses
Jno. [illegible]
J. Stewart Rice
Inventor
John Quin,
By Ridout & Maybee
Attorneys
THE NORRIS PETERS CO., PHOTO-LITHO., WASHINGTON, D. C.

UNITED STATES PATENT OFFICE.

JOHN QUIN, OF TORONTO, CANADA.

SANDER FOR RAILWAYS.

SPECIFICATION forming part of Letters Patent No. 704,210, dated July 8, 1902.

Application filed August 24, 1901. Serial No. 73,190. (No model.)

*To all whom it may concern:*

Be it known that I, JOHN QUIN, of the city of Toronto, in the county of York, Province of Ontario, Canada, have invented certain new and useful Improvements in Sanders for Railways, of which the following is a specification.

The object of my invention is to devise a cheap and reliable sander for railways which will give a continuous flow of sand while in operation; and it consists, essentially, of a hopper having a discharge-spout projecting downward into a rotatable pan and a stationary plate forming a plow which projects down into the rotatable pan close to its outer edge.

My invention further consists in such details of construction as are hereinafter more specifically described and then definitely claimed.

Figure 1 is a vertical sectional elevation of my improved sander. Fig. 2 is a section on the line $x\,y$ in Fig. 1. Fig. 3 is a skeleton plan view of a car-bottom provided with my sander. Fig. 4 is a vertical elevation showing an automatic indicator for showing the quantity of sand in the sand-box. Fig. 5 is a cross-section of the indicator.

In the drawings like letters of reference indicate corresponding parts in the different figures.

A is a sand-box of which one is preferably provided for each rail. (See Fig. 3.) B is a hopper-bottom formed therein, terminating in the downward-projecting spout C. This spout projects down within a rotatable pan H, secured to the shaft D, suitably journaled in the bars E and F at the top and bottom of the sand-box.

I is a central cone formed within the pan H about the shaft D, its object being to direct the sand passing through the spout C toward the outside of the pan. If the bottom G of the pan were sufficiently great in circumference, the rim of the pan might in some cases be dispensed with, as the sand would flow down between the spout C and the cone I into the bottom G and after finding its angle of repose no more would flow out through the hopper; but I find that more certain results are obtained when the pan is constructed as shown.

J is a stationary plow, connected to the spout C or other stationary part and projecting into the pan H adjacent to its outer edge. This stationary plow is preferably inclined, as indicated in Fig. 2, though it would work in a measure if it were vertical. When the pan H is rotated, the sand therein is forced against the plow J, and as it is continually pushed on by the sand behind it is raised up in front of the plow and falls over the edge of the pan, where it is caught in the spout K, suitably supported and arranged to supply the sand to the rail underneath. Of course the plow might be rotated and the pan stand still; but as the point at which the sand will fall over will travel all around the periphery of the pan the upper edge of the spout K would have to be made a great deal larger than it is shown.

For the purpose of rotating the shaft D, and with it the pan H, I provide the lower end of the shaft with a bevel gear-wheel L', with which meshes a bevel-pinion $c$, fast on the shaft D', which extends between the two sand-boxes, which are necessarily provided one for each rail. On the shaft D' is located the bevel gear-wheel $f$, meshing with the bevel-pinion $g$, fast on shaft L, which is suitably journaled below the body of the car and extends to the platform thereof. It is here provided with a small bevel gear-wheel $d$, which meshes with the bevel gear-wheel $e$, fast on the lower end of a suitably-journaled screw-threaded spindle L''. The upper end of this spindle is provided with a suitably-operating crank handle or wheel and its lower end with a ratchet and pawl M. On the spindle is screwed a nut N, provided with projecting wings $a$. These wings are adapted to fit within the grooved guides O, which are hinged at $b$ to the platform of the car. The upper ends of these guides are engaged by a sliding lock R, which slips up the spindle to permit of the guides O being hinged back to release the nut A. The guides O have a scale marked thereon to indicate exactly the condition of the sand-box between full and empty. This part of the device operates substantially as follows: By the rotation of the spindle the pan H is revolved and sand discharged. At the same time the nut N is raised a corresponding extent on the spindle O, and the scale is arranged by noting the position of the nut at different levels of the sand within the sand-box. When the nut has risen to the point marked "Empty," or thereabout, the motorman is thereby warned to refill the sand-box. At the same time he lifts the lock R, throws back the guides O, and twirls the nut N down again to the bottom of the spindle L".

I find that my sander is very reliable in operation, giving an even and continuous stream. It is not affected by the oscillation of the car, nor is it liable to be jammed up by pebbles or small stones becoming mixed with the sand.

What I claim as my invention is—

1. In a sander, a pan capable of continuous rotation in the same direction, a hopper provided with a spout projecting into said pan, means for rotating said pan at will and means for causing the sand to overflow the pan whenever the latter is rotated, substantially as described.

2. In a sander, a rotatable pan, a hopper provided with a spout projecting into said pan, means for rotating said pan at will, and means for causing the sand to overflow the pan, said means comprising a plow projecting into said pan, substantially as described.

3. In a sander, a rotatable pan provided with a central cone, in combination with a hopper provided with a discharge-spout projecting down within the pan, substantially as described.

4. In a sander, a rotatable pan; and a stationary plow so held as to project down within the pan close to its outer edge, in combination with a hopper provided with a spout projecting down within the pan, substantially as described.

5. In a sander, a rotatable pan; the central cone secured within the pan; and a stationary plow so held as to project down within the pan close to its outer edge, in combination with a hopper provided with a spout projecting down within the pan, substantially as described.

6. In a sander, a rotatable pan; a central cone secured within the pan; and a stationary plow so held as to project down within the pan close to its outer edge in combination with means for supplying sand to the pan, substantially as described.

7. In a sander, a rotatable pan; a central cone secured within the pan; and a stationary plow so held as to project down within the pan close to its outer edge, in combination with a hopper provided with a spout projecting down within the pan; and a spout into which the sand is discharged, substantially as described.

8. In a sander, a rotatable pan; gearing adapted to drive the same; a screw-threaded rotatable crank-spindle adapted to operate the said gearing, a nut engaging the said screw-headed spindle; means for preventing the said nut from rotating or releasing it at will; in combination with a stationary plow projecting down within the pan close to its outer edge; and a hopper provided with a spout projecting down within the pan substantially as described.

9. In a sander a pan, in combination with a hopper provided with a spout projecting down within the pan; a plow held so as to project down within the pan close to its outer edge; and means for revolving the pan and plow relatively to one another, substantially as described.

Toronto, August 22, 1901.

JOHN QUIN.

In presence of—
J. EDW. MAYBEE,
A. J. COLBOURNE.